(12) United States Patent
Milicic et al.

(10) Patent No.: US 9,733,100 B2
(45) Date of Patent: Aug. 15, 2017

(54) CONTACT-ANALOGUE DISPLAY, IN PARTICULAR OF A LANE CHANGE

(71) Applicant: Bayerische Motoren Werke Aktiengesellschaft, Munich (DE)

(72) Inventors: Natasa Milicic, Munich (DE); Boris Israel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/644,532

(22) Filed: Mar. 11, 2015

(65) Prior Publication Data

US 2015/0185039 A1    Jul. 2, 2015

Related U.S. Application Data

(63) Continuation of application No. PCT/EP2013/066792, filed on Aug. 12, 2013.

(30) Foreign Application Priority Data

Sep. 12, 2012 (DE) .................. 10 2012 216 144

(51) Int. Cl.
*G01C 21/36* (2006.01)

(52) U.S. Cl.
CPC ..... *G01C 21/3658* (2013.01); *G01C 21/3655* (2013.01)

(58) Field of Classification Search
CPC ................. G01C 21/3658; G01C 21/3655
See application file for complete search history.

(56) References Cited

U.S. PATENT DOCUMENTS

| 5,323,321 A | 6/1994 | Smith, Jr. |
| 2003/0078728 A1 | 4/2003 | Engelsberg et al. |

(Continued)

FOREIGN PATENT DOCUMENTS

| DE | 10 2005 022 769 A1 | 12/2005 |
| DE | 10 2010 052 000 A1 | 5/2012 |

(Continued)

OTHER PUBLICATIONS

International Search Report (PCT/ISA/210) dated Nov. 19, 2013 with English translation (five pages).

(Continued)

*Primary Examiner* — Angela Ortiz
*Assistant Examiner* — Garrett Evans
(74) *Attorney, Agent, or Firm* — Crowell & Moring LLP

(57) ABSTRACT

A method is disclosed for the contact-analog display of a navigation instruction for a driving maneuver, particularly a lane change, of a vehicle, wherein the driving maneuver can be carried out at any point of a cohesive driving route of a road. The method includes: contact-analog stationary displaying of the instruction at the beginning of the driving route for a first distance traveled by the vehicle; adapting the contact-analog display of the instruction to the change of position of the vehicle, so that the instruction changes its position corresponding to the change of position of the vehicle, for a second distance traveled by the vehicle; and contact-analog stationary displaying of the instruction at the end of the driving route, for a third distance traveled by the vehicle.

14 Claims, 3 Drawing Sheets

(56) References Cited

U.S. PATENT DOCUMENTS

| | | | |
|---|---|---|---|
| 2005/0154505 A1* | 7/2005 | Nakamura | G01C 21/365 |
| | | | 701/1 |
| 2005/0273252 A1 | 12/2005 | Nix et al. | |
| 2009/0125234 A1 | 5/2009 | Geelen et al. | |
| 2009/0240426 A1 | 9/2009 | Akita et al. | |
| 2010/0268452 A1* | 10/2010 | Kindo | G01C 21/30 |
| | | | 701/533 |
| 2012/0268351 A1* | 10/2012 | Sasaki | G01C 21/365 |
| | | | 345/8 |
| 2013/0253830 A1 | 9/2013 | Breisinger et al. | |

FOREIGN PATENT DOCUMENTS

| | | |
|---|---|---|
| EP | 1 942 314 A1 | 7/2008 |
| EP | 2 159 541 A1 | 3/2010 |
| JP | 2011-121401 A | 6/2011 |
| WO | WO 02/10838 A1 | 2/2002 |

OTHER PUBLICATIONS

German Search Report dated Jan. 9, 2013 with partial English translation (nine pages).

\* cited by examiner

CONTACT-ANALOGUE DISPLAY, IN PARTICULAR OF A LANE CHANGE

CROSS REFERENCE TO RELATED APPLICATIONS

This application is a continuation of PCT International Application No. PCT/EP2013/066792, filed Aug. 12, 2013, which claims priority under 35 U.S.C. §119 from German Patent Application No. 10 2012 216 144.9, filed Sep. 12, 2012, the entire disclosures of which are herein expressly incorporated by reference.

BACKGROUND AND SUMMARY OF THE INVENTION

The invention relates to a method for the contact-analogue display of a navigation instruction concerning a driving maneuver, particularly a lane change, of a vehicle, as well as to a correspondingly equipped device.

Navigation systems for vehicles are currently widespread. By use of navigation systems, information concerning the next driving maneuver (or driving maneuvers) can be provided to the driver of the vehicle during his drive as a function of the route. These instructions may be offered to the driver in a contact-analogue manner (also called "augmented reality"). Monitors, LCD displays, head-up displays or head-mounted displays are generally suitable for this purpose. A projection of the instructions onto the road is also contemplated.

Nowadays, instructions concerning a lane change are indicated in a contact-analogue display by lines that lead to the navigation destination and indicate the path to be driven on the road, or by individual arrows that are situated on the road and fixedly mark the point of the maneuver to be driven at that location.

It is a disadvantage of this manner of displaying the instruction when the driving maneuver can actually be carried out not only at the indicated location but over a cohesive driving route, which is sometimes also called a radius of action. In this case, the cohesive driving route or radius of action includes a longer route or a larger area than typically specified, for example, for turn-off operations due to road construction and road markings. This is, for example, a driving route that is generally viewed by drivers as suitable for providing them with choices as to when the maneuver should be carried out. As a result of a fixed marking of a location, the driver may feel pressured to have to carry out the maneuver precisely at this location, possibly also driven by the fact that otherwise he no longer sees the navigation instruction because it is no longer displayed. This may have the result that the driver does not act in keeping with traffic regulations and does not take the time that would be necessary for carrying out a safe driving maneuver, for example, he may not look over his shoulder before a lane change.

It is therefore an object of the invention to provide a navigation instruction which eliminates the above-mentioned disadvantages for a driving maneuver that can be carried out in more than one location.

This and other objects are achieved by a method, and correspondingly equipped device, for the contact-analogue display of a navigation instruction concerning a driving maneuver, particularly a lane change, of a vehicle, wherein the driving maneuver can be carried out at any point along a cohesive driving route of a road. The method includes the steps of: contact-analogue stationary displaying of the instruction at the beginning of the driving route for a first distance traveled by the vehicle; adapting the contact-analogue display of the instruction to the change of position of the vehicle, so that the instruction changes its position corresponding to the change of position of the vehicle, for a second distance traveled by the vehicle; and contact-analogue stationary displaying of the instruction at the end of the driving route, for a third distance traveled by the vehicle.

In this manner, the instruction is displayed to the driver in the position from which the driving maneuver is possible, and the driver recognizes that the maneuver can be carried out starting from there. The instruction is situated in this position in a stationary, therefore fixed manner, and is used as a preliminary indication of the driving maneuver. In the following, this instruction will then be adapted to the changed position of the vehicle. In particular, the instruction is postponed when the vehicle is approaching the position of the first stationary instruction. The driver therefore particularly has the impression that the instructions are pushed along in front of the vehicle in order to constantly point out the maneuver. Finally, at the end of the driving route, the instruction is again displayed in a stationary manner, which makes clear to the driver that he should have carried out the driving maneuver by then.

The driver is therefore not pressured to carry out the driving maneuver at a specified location, if the driving maneuver can be carried out at several points of a driving route. This allows safe road behavior.

Navigation instructions may be arrows or objects. As a result of the adaptation of the contact-analogue display, the instruction is advantageously displayed such that it appears to be at a constant distance in front of the vehicle. In this manner, the driver is, on the one hand, not urged to carry out the driving maneuver but, on the other hand, the necessity of a maneuver is clearly illustrated.

In a variant, the instruction is displayed when adapting the contact-analogue display along the road. Furthermore, the instruction may appear to the driver above the road of the driving route.

In a preferred further development, the stationary displaying of the instruction at the end of the route comprises an animated displaying of the instruction which, in particular, points out the last possibility of carrying out the driving maneuver. An end of the possibility of carrying out the driving maneuver is therefore clearly indicated to the driver. The animation may have the purpose of making it easier for the driver to differentiate between the instruction and the adaptation of the instruction as a result of the change of position of the vehicle.

The first, second and third traveling distance may be spatially arranged such that they can be traveled by the vehicle in this sequence. In other words, the first, second and third traveling distance are successively arranged for the driver. In this case, the arrangement is such that the first traveling distance is arranged before the cohesive driving route, the second traveling distance starts before the cohesive driving route and overlaps with the latter or ends before the latter, and/or the third traveling distance starts within the cohesive driving route and ends with the latter. It thereby becomes possible to prewarn the driver sufficiently early before he passes the start or the end of the driving route.

In combination with the driver assistance system, an optimal point-in-time for the lane change can additionally be indicated, for example, by an animation of the navigation instruction.

A device is disclosed which includes a navigation system and a display for contact-analogue displaying. The device is equipped for implementing the above-described method.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
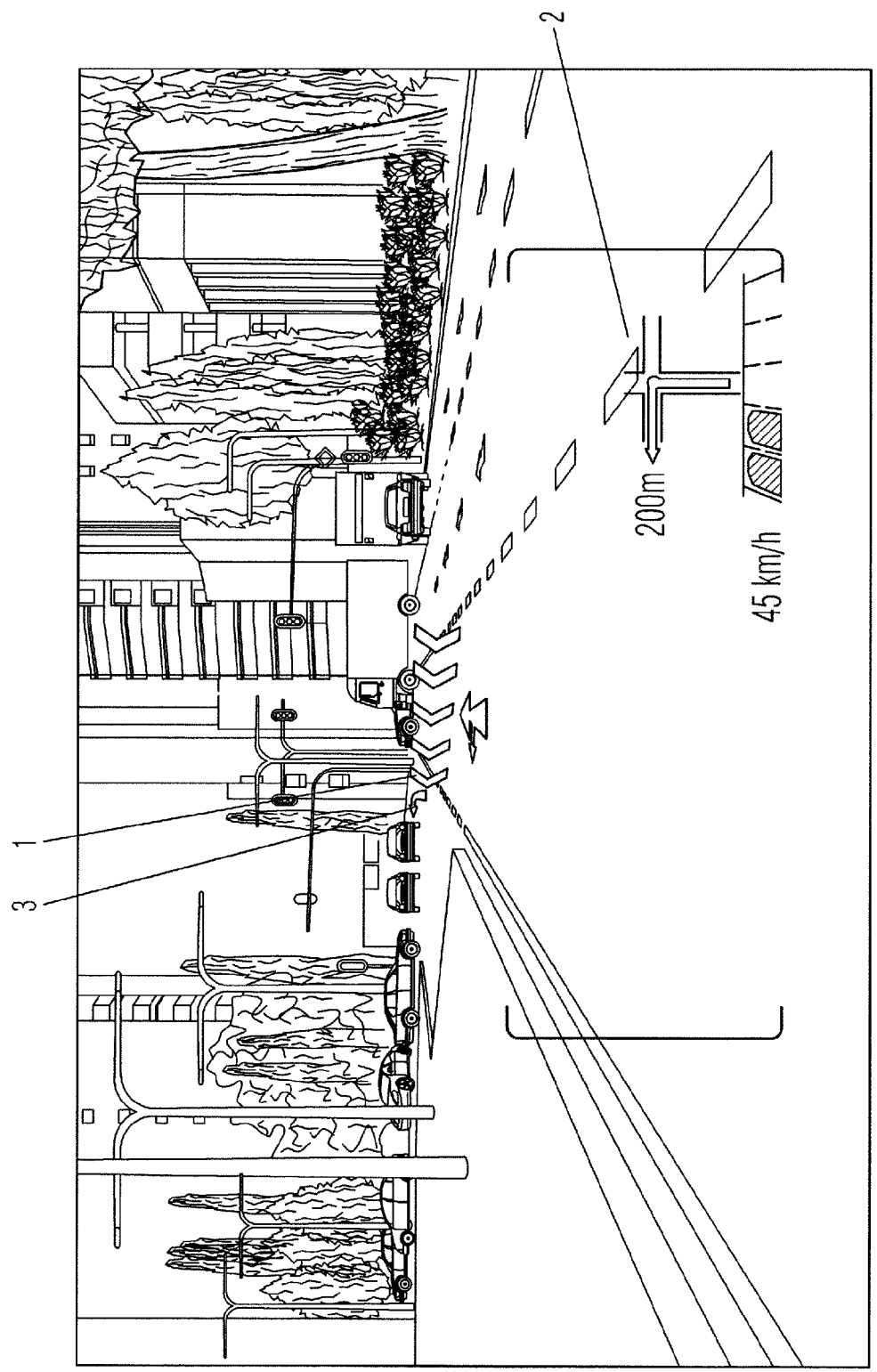
FIG. 1 is a view of an example of a display of a head-up display device with navigation instructions at a first distance before an intersection.

FIG. 1 illustrates an example of a display of a head-up display device with navigation instructions 1 to 3 at a first distance before an intersection. In the illustrated traveling direction, five lanes lead into the intersection, in which case, for turning off to the left, a vehicle should travel only on the two driving lanes arranged the farthest to the left. The three driving lanes arranged the farthest to the right are used only for the straight crossing of the intersection or for turning off to the right. The vehicle is situated at a distance from the intersection at which only three driving lanes are present side-by-side in the traveling direction. A navigation system of the vehicle guides the driver along a computed or specified route. This route provides for the vehicle to turn off to the left at the next intersection at the traffic light.

Reference number 2 indicates the already known navigation instructions. These instructions indicate that after 200 m, the route turns off to the left at the next intersection and that, for this purpose, the vehicle has to get into the two proper lanes arranged the farthest on the left.

In addition, the speed is indicated. By means of the arrow 3, the location of the turning-off at the intersection is indicated in a contact-analogue manner.

For the driving maneuver of changing into one of the two lanes arranged the farthest to the left, the instruction marked by reference number 1 is displayed to the driver. This instruction comprises five arrows arranged side-by-side. The instruction seems to spatially float above the point of the road from which a change can be made onto the two lanes arranged the farthest to the left. This is the point from which the two lanes arranged the farthest to the left are opened up, which is recognizable by the curbside bending to the left in FIG. 1 and the driving lanes beginning thereafter. At this point, instruction 1 is displayed in a contact-analogue and stationary manner for the driver; i.e. the driver has the impression that he would come closer to the instruction 1 as he continues driving.

Figure 2:
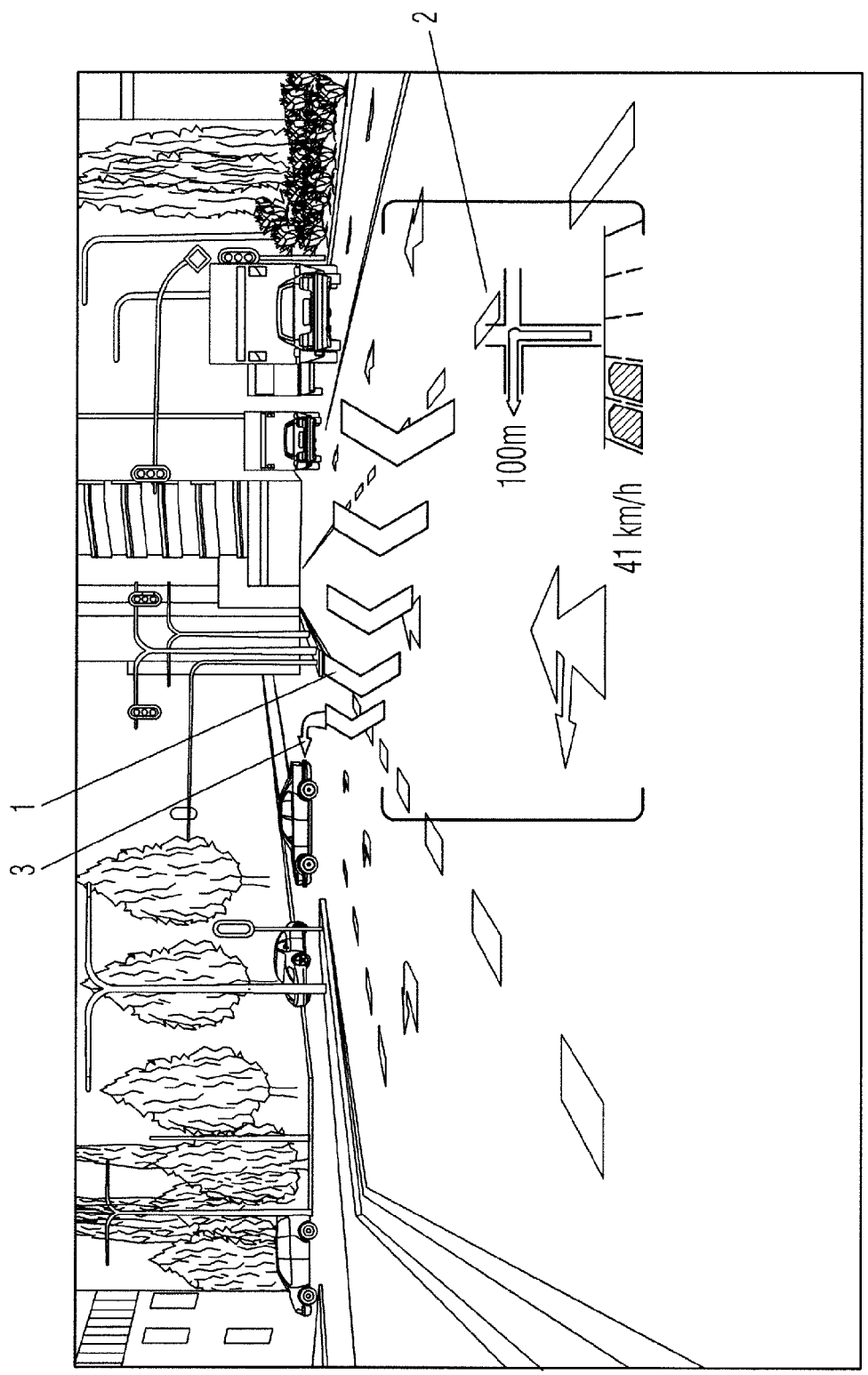
FIG. 2 is a view of an example of a display of a head-up display device at a second distance before an intersection.

FIG. 2 illustrates an example of a display of a head-up display device with navigation instructions 1 to 3 before the same intersection as that illustrated in FIG. 1, but now at a different distance, specifically 100 m before the intersection. The same reference numbers indicate corresponding elements.

The display has changed in that the navigation instruction 1, which indicates that the vehicle is to change to the driving lane on the left, no longer seems to float above the point at which the curbside bends toward the left or the driving lanes are opened up which are situated the farthest to the left, but rather is displaced a little farther in the direction of the intersection. However, simultaneously, the navigation instruction 1 is also arranged closer to the vehicle, which is illustrated, for example, by an enlargement of the instruction 1. As the vehicle continues to drive in the center lane, the instruction 1 will always be situated at this distance in front of the vehicle and thereby move along with it (until there is no longer the possibility of changing the driving lane).

In this example, the navigation instruction 1 had remained stationary in its position, as illustrated in FIG. 1, until the vehicle was in front of the instruction 1 at the distance illustrated in FIG. 2 between the vehicle and the instruction 1. Starting from this point, the instruction 1 was displayed at the distance between the vehicle and the instruction 1 illustrated in FIG. 2 and had therefore moved along with the vehicle and was thereby adapted.

Figure 3:
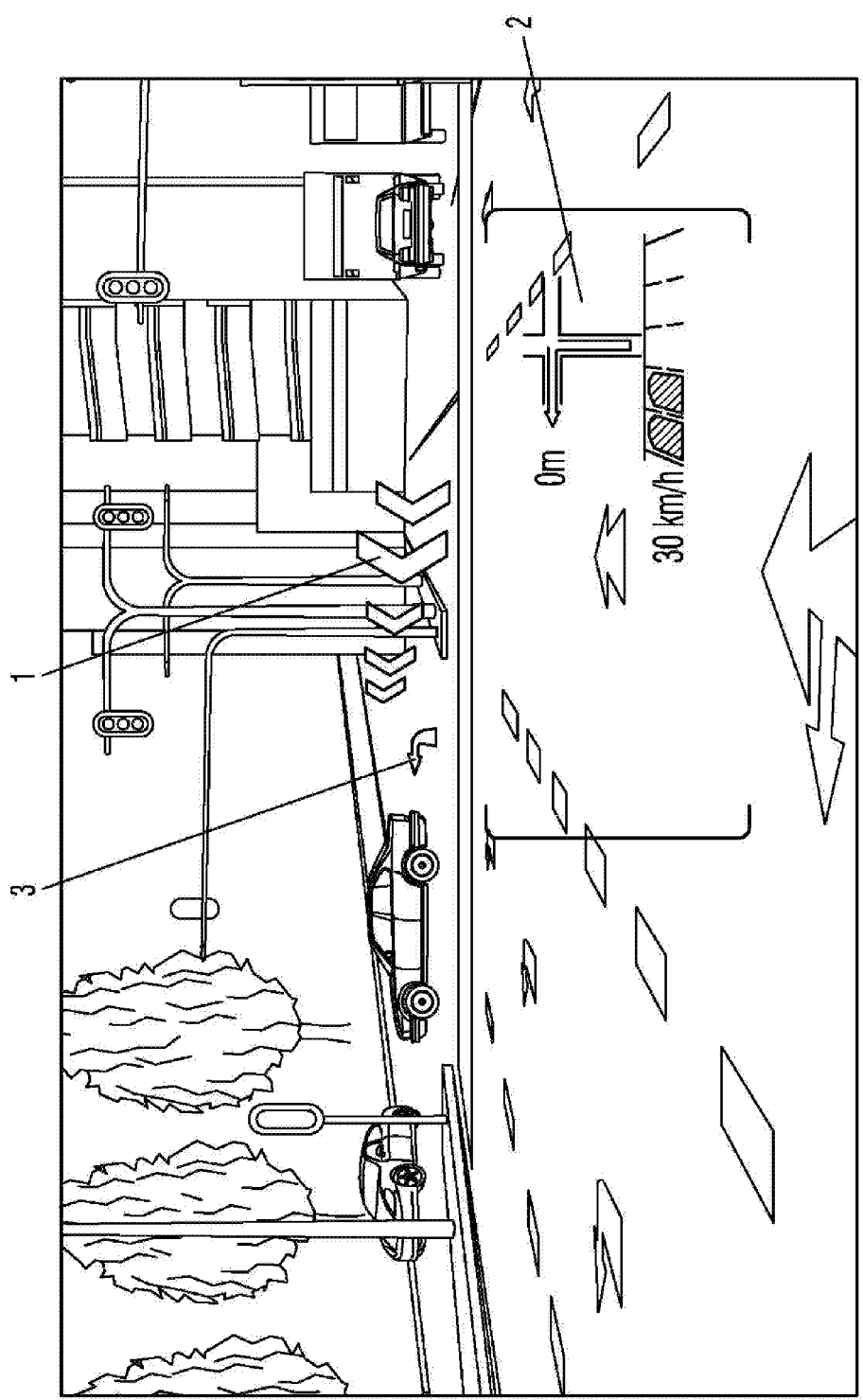
FIG. 3 is a view of an example of a display of a head-up display device at a third distance before an intersection.

When the vehicle continues to travel straight ahead on the current lane, the instruction 1 will be displayed at the stop line of the traffic light of the intersection contact-analogously with this stop line, as shown in FIG. 3. Simultaneously, the instruction 1 will be animated in that the arrows are sequentially enlarged and reduced again to the original size, specifically in a sequence from the right to the left. This has the purpose of explaining to the driver that it is now necessary to change the lane toward the left at this point.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a contact-analog display of a navigation system of a vehicle, the method comprising the acts of:
    for a first distance traveled by the vehicle at a beginning of a driving route, displaying a navigation instruction describing a driving maneuver to be carried out at any point along a cohesive driving route of a road in a contact-analog stationary manner in which the navigation instruction appears from a driver position in the vehicle to be stationary at a position along the driving route as the vehicle advances;
    for a second distance traveled by the vehicle, adapting the contact-analog display of the navigation instruction to a change of position of the vehicle, wherein the navigation instruction appears from the driver position in the vehicle to advance along the driving route as the vehicle advances along the driving route; and
    for a third distance traveled by the vehicle, displaying the navigation instruction in the contact-analog stationary manner such that the navigation instruction appears from the driver position in the vehicle to be stationary at an end of the cohesive driving route.

2. The method according to claim 1, wherein the adapted contact-analog display of the navigation instruction for the second distance is such that the navigation instruction appears to be at a constant distance in front of the vehicle.

3. The method according to claim 2, wherein the navigation instruction is displayed when adapting the contact-analog display along the road.

4. The method according to claim 1, wherein the navigation instruction is displayed so as to appear to be situated above the road of the driving route.

5. The method according to claim 1, wherein the displaying of the navigation instruction in the contact-analog stationary manner at the end of the driving route is carried out by animating the navigation instruction displayed so as to indicate a last possible carrying out of the driving maneuver.

6. The method according to claim 1, wherein the first, second, and third traveling distances are arranged spatially such that the vehicle will travel the distances in sequence.

7. The method according to claim 1, wherein
the first traveling distance starts before the cohesive driving route,
the second traveling distance starts before the cohesive driving route and overlaps with the cohesive driving route while ending before an end of the cohesive driving route, and
the third traveling distance starts within the cohesive driving route and ends at the end of the cohesive driving route.

8. The method according to claim 1, wherein the driving maneuver is a lane change of the vehicle.

9. An apparatus, comprising:
a navigation system;
a display of the navigation system, the display being equipped for a contact-analog displaying of a driving maneuver of a vehicle that can be carried out at any point of a cohesive driving route of a road on which the vehicle travels;
wherein the navigation system executes a program to:
for a first distance traveled by the vehicle at a beginning of a driving route, display a navigation instruction describing a driving maneuver to be carried out at any point along the cohesive driving route of the road in a contact-analog stationary manner in which the navigation instruction appears from a driver position in the vehicle to be stationary at a position along the driving route as the vehicle advances;
for a second distance traveled by the vehicle, adapt the contact-analog display of the navigation instruction to a change of position of the vehicle, wherein the navigation instruction appears from the driver position in the vehicle to advance along the driving route as the vehicle advances along the driving route; and
for a third distance traveled by the vehicle, displaying the navigation instruction in the contact-analog stationary manner such that the navigation instruction appears from the driver position in the vehicle to be stationary at an end of the cohesive driving route.

10. The apparatus according to claim 9, wherein the navigation instruction is a lane change of the vehicle.

11. The apparatus according to claim 10, wherein the navigation system further executes a program to have the adapted contact-analog display of the navigation instruction for the second distance be such that the navigation instruction appears to be at a constant distance in front of the vehicle.

12. The apparatus according to claim 10, wherein the navigation system further executes a program to display the navigation instruction when adapting the contact-analog display along the road.

13. The apparatus according to claim 10, wherein the navigation system further executes a program to have the navigation instruction displayed so as to appear to be situated above the road of the driving route.

14. The apparatus according to claim 10, wherein the navigation system further executes a program to:
display the navigation instruction in the contact-analog stationary manner at the end of the driving route by animating the navigation instruction displayed so as to indicate a last possible carrying out of the driving maneuver.

* * * * *